W. F. WERNER.
FURNITURE FOOT.
APPLICATION FILED AUG. 9, 1918.

1,305,427. Patented June 3, 1919.

WITNESS
Chas. F. Clagett

INVENTOR
William F. Werner
BY
HIS ATTORNEYS

UNITED STATES PATENT OFFICE.

WILLIAM F. WERNER, OF BROOKLYN, NEW YORK.

FURNITURE-FOOT.

1,305,427.  Specification of Letters Patent.  Patented June 3, 1919.

Application filed August 9, 1918. Serial No. 249,048.

*To all whom it may concern:*

Be it knows that I, WILLIAM F. WERNER, a subject of the Emperor of Germany, (who has declared his intention of becoming a citizen of the United States,) residing at Brooklyn, in the county of Kings, city and State of New York, have invented an Improvement in Furniture-Feet, of which the following is a specification.

As is more or less generally understood, difficulty is oftentimes experienced in making chairs, tables and other small articles of furniture, as well as pianos, billiard tables and other more or less heavy articles of furniture stand level on the floor. This may be due either to a fault in the legs of any particular article of furniture, or to unevenness in the floor.

I am aware that heretofore various forms of adjustable feet for furniture have been suggested, and it is to this type of furniture-foot that the present invention relates, the object thereof being to supply a relatively inexpensive adjustable furniture-foot and one which may be easily applied and adjusted to position in use. The improved furniture-foot made in accordance with my invention, will be hereinafter more particularly described.

Figure 1:
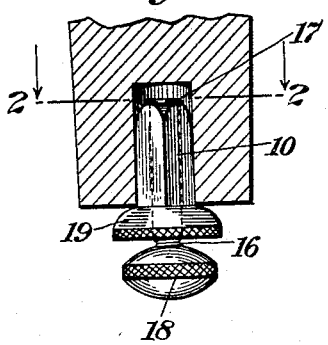
Figure 1 is a side elevation of a furniture-foot made in accordance with this invention.
Figure 2:
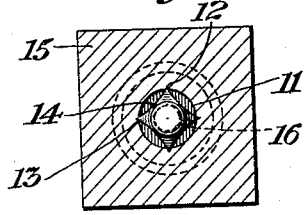
Fig. 2 is a cross section on line 2, 2, Fig. 1.

Referring to the drawings, and particularly to Figs. 1 and 2, it will be seen that in carrying out this invention, I employ a socket member 10 which may be made of any suitable metal and is preferably provided with longitudinal concave surfaces 11 provided with ribs or corners 12 adapted to be received in grooves 13 provided therefor in a bore 14 made in the end of a leg 15 of any piece of furniture. The socket 10 is made with a screw-threaded bore to receive a screw stem 16, which after passing through the socket, is upset at its inner end as indicated at 17, so as to prevent the ordinary removal of the screw stem from the socket. At its opposite or outer end, the screw stem 16 is provided with a knob or foot 18 which bears upon the floor or other surface supporting the article of furniture. Also fitted on the screw stem 16 is a lock nut 19.

As will be understood, in the use of this invention, the socket with the parts associated therewith may be driven into the bore provided therefor in the end of the leg of a piece of furniture with the ribs or corners 12 lying in the grooves 13 provided therefor, so that the socket will not turn in the furniture leg. In driving the adjustable foot to position, it is preferable to turn the lock nut 19 down against the foot 18 and then turn the screw stem so that the opposite surface of the lock nut will bear against the adjacent end of the socket 10. In so doing, as will be understood, the minimum amount of strain will be brought to bear on the screw threads in driving the foot to position. It will also be apparent that when fixed in a furniture leg, the screw stem 16 and the foot 18 may be adjusted to the proper position and then locked therein by turning the lock nut to place against the adjacent end of the socket.

Figure 3:
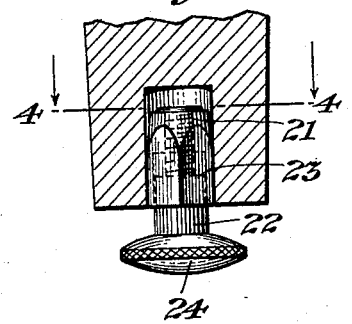
Fig. 3 is a view similar to Fig. 1, showing another form of the invention.
Figure 4:
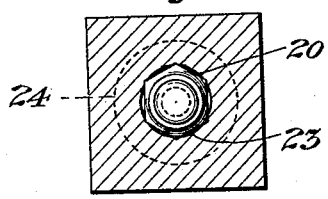
Fig. 4 is a cross section on line 4, 4, Fig. 3.

By reference to Figs. 3 and 4, it will be seen that instead of making the socket substantially square as shown in Figs. 1 and 2, the same may be made hexagonal in cross section, the outer faces thereof being indicated at 20, although the invention is not limited to any particular number of faces which may be formed in the surface of the socket.

In the structure shown in Figs. 3 and 4, however, the screw stem is indicated at 21 and engages the screw threaded bore in the socket in the same manner as in the similar parts described in connection with Figs. 1 and 2. The outer end of the screw stem is enlarged as indicated at 22, forming a shoulder 23 between these parts, and the enlarged portion 22 of the stem is adapted and fitted to turn within the plain surface bore in the outer end of the socket, the foot or knob in this instance being indicated at 24.

Figure 5:
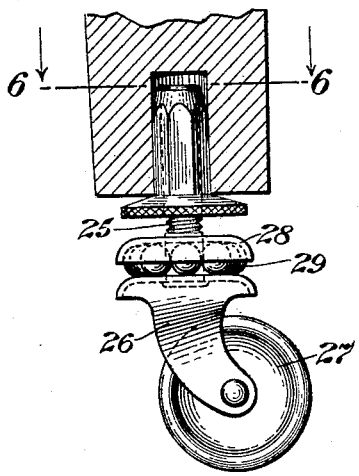
Fig. 5 is also a view similar to Figs. 1 and 3, showing the application of the invention to a caster.
Figure 6:
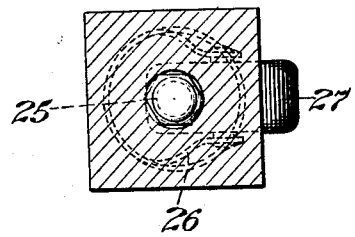
Fig. 6 is a cross section on line 6, 6, Fig. 5.

As shown in Figs. 5 and 6, the invention may be applied to any form of caster, and as illustrated, the screw stem 25 is pivotally connected at its outer end to the caster bracket 26 in which the roller 27 is mounted. This structure also shows a disk 28 fixed adjacent the outer end of the stem 25 and adapted to act as a part of the bearing for the balls or rollers 29 placed between the disk and the upper surface of the bracket 26. Otherwise the structure shown in Figs. 5 and 6 is similar and equivalent to that shown in Figs. 1 and 2.

I claim as my invention:

1. A furniture foot comprising a socket adapted to fit a bore provided therefor in the end of a leg of a piece of furniture, a screw-threaded stem adjustable in said socket and upset at its inner end to prevent its removal from the socket, and a foot at the outer end of the said stem.

2. A furniture foot comprising a socket adapted to fit a bore provided therefor in the end of a leg of a piece of furniture, a screw-threaded stem adjustable in said socket and upset at its inner end to prevent its removal from the socket, a foot at the outer end of the said stem, and means for securing said stem and foot in position relatively to the socket.

3. A furniture-foot comprising a socket having ribs running longitudinally on its outer surface and adapted to engage the grooves provided therefor in a bore in the end of a leg of a piece of furniture, a screw threaded stem adjustable in the said socket and upset at its inner end to prevent its removal from the socket, a foot on the outer end of the stem, and means for securing the stem and foot in position relatively to the socket.

4. A furniture-foot comprising a socket having ribs running longitudinally on its outer surface and adapted to engage the grooves provided therefor in a bore in the end of a leg of a piece of furniture, a screw threaded stem adjustable in the said socket and upset at its inner end to prevent its removal from the socket, a foot on the outer end of the stem, and a lock nut on said stem intermediate of the foot and socket.

Signed by me this 9th day of July, 1918.

WILLIAM F. WERNER.

Copies of this patent may be obtained for five cents each, by addressing the "Commissioner of Patents, Washington, D. C."